United States Patent
Peters et al.

(10) Patent No.: US 9,752,606 B2
(45) Date of Patent: Sep. 5, 2017

(54) UNIVERSAL PEDESTAL MOUNTING ASSEMBLY

(71) Applicant: Release Marine, Inc., Savannah, GA (US)

(72) Inventors: Samuel M. Peters, Savannah, GA (US); Matt Hecht, Savannah, GA (US)

(73) Assignee: RELEASE MARINE, INC., Savannah, GA (US)

( * ) Notice: Subject to any disclaimer, the term of this patent is extended or adjusted under 35 U.S.C. 154(b) by 204 days.

(21) Appl. No.: 13/961,340

(22) Filed: Aug. 7, 2013

(65) Prior Publication Data

US 2014/0041204 A1 Feb. 13, 2014

Related U.S. Application Data

(60) Provisional application No. 61/680,603, filed on Aug. 7, 2012.

(51) Int. Cl.
*F16B 9/02* (2006.01)
*A47B 13/02* (2006.01)

(52) U.S. Cl.
CPC ............ *F16B 9/026* (2013.01); *A47B 13/023* (2013.01); *Y10T 29/49963* (2015.01); *Y10T 403/46* (2015.01)

(58) Field of Classification Search
CPC ............ E04H 12/2253; E04H 12/2261; E04H 12/2269; E04H 12/2276; B63B 29/06; F16M 2200/08; Y10T 29/49963; Y10T 29/49961; Y10T 29/49947; Y10T 29/49948; Y10T 29/49631; Y10T 403/46; F16B 9/026; A47B 13/023
USPC ............... 248/507, 519, 188.8, 539
See application file for complete search history.

(56) References Cited

U.S. PATENT DOCUMENTS

| | | | | |
|---|---|---|---|---|
| 1,225,795 | A | * | 5/1917 | Fraser ........................... 285/414 |
| 1,291,823 | A | * | 1/1919 | Fuller ............................... 52/40 |
| 1,744,425 | A | * | 1/1930 | Wanner ................ A47B 13/023 248/158 |
| 1,772,159 | A | * | 8/1930 | Roth .................... E04F 11/1834 256/65.08 |
| 2,121,961 | A | * | 6/1938 | Gill .................................. 404/10 |
| 3,073,660 | A | * | 1/1963 | Schultz ................ A47B 13/023 108/150 |

(Continued)

FOREIGN PATENT DOCUMENTS

DE 19745358 C1 * 12/1998 .......... E04F 11/1812

OTHER PUBLICATIONS

RealSimple space saver sold by Bed Bath and Beyond. No date.*

*Primary Examiner* — David Bryant
*Assistant Examiner* — Lawrence Averick
(74) *Attorney, Agent, or Firm* — Nixon & Vanderhye P.C.

(57) ABSTRACT

A universal pedestal mounting assembly includes a lower support structure securable on a supporting surface, an adapter coupled with the lower support structure, and a pedestal tube positioned over the adapter. The adapter is sized corresponding to the pedestal tube. An upper support structure is positioned on the pedestal tube and is configured to secure a component supported on the universal pedestal mounting assembly. A rod is secured between the lower support structure and the upper support structure. The assembly enables pedestal tubes of various sizes to be mounted using the same hardware.

11 Claims, 7 Drawing Sheets

(56) References Cited

U.S. PATENT DOCUMENTS

| | | | | |
|---|---|---|---|---|
| 3,153,524 | A * | 10/1964 | Greenfield | A47B 13/023 108/150 |
| 3,391,660 | A * | 7/1968 | Stewart | A47B 3/00 108/150 |
| 3,691,776 | A * | 9/1972 | Hull | 405/232 |
| 3,707,930 | A * | 1/1973 | Yindra | A47B 9/04 108/147 |
| 3,719,376 | A * | 3/1973 | Johnson | 403/263 |
| 3,994,461 | A * | 11/1976 | Dorantes | A47B 13/023 108/150 |
| 4,043,278 | A | 8/1977 | Kessler et al. | |
| 4,117,784 | A * | 10/1978 | Piretti | A47B 3/06 108/150 |
| 4,178,858 | A * | 12/1979 | Ponzellini | A47B 13/023 108/150 |
| 4,429,497 | A * | 2/1984 | Dibernardi | 52/27 |
| 4,662,591 | A | 5/1987 | Encontre | |
| 4,789,122 | A | 12/1988 | Gutgsell | |
| 4,793,111 | A * | 12/1988 | Shewchuk | 52/298 |
| 4,809,955 | A * | 3/1989 | Veilleux | 256/65.02 |
| 5,404,682 | A * | 4/1995 | West | 52/165 |
| 5,481,846 | A | 1/1996 | Macchietto | |
| 5,568,909 | A * | 10/1996 | Timko | 248/519 |
| 5,638,758 | A | 6/1997 | Carr | |
| 5,722,205 | A * | 3/1998 | Gannaway | 52/155 |
| 5,873,671 | A * | 2/1999 | West | 403/232.1 |
| RE36,550 | E * | 2/2000 | West | A47G 29/1216 248/183.1 |
| 6,141,928 | A * | 11/2000 | Platt | 52/296 |
| 6,189,843 | B1 * | 2/2001 | Pfister | A47B 9/083 248/157 |
| 6,336,620 | B1 * | 1/2002 | Belli | 248/519 |
| 6,378,816 | B1 * | 4/2002 | Pfister | A47B 9/083 248/157 |
| 6,484,649 | B1 | 11/2002 | Wang | |
| 6,568,145 | B2 * | 5/2003 | Bartel | E04F 11/181 256/59 |
| 6,742,748 | B1 * | 6/2004 | Gretz | 248/156 |
| 6,932,329 | B1 * | 8/2005 | Harder | E04F 11/1834 256/19 |
| 6,948,283 | B2 * | 9/2005 | Burkart et al. | 52/155 |
| 6,988,700 | B2 * | 1/2006 | Cote | 248/519 |
| 7,137,230 | B2 * | 11/2006 | McCarthy | E04F 11/1812 52/832 |
| 7,455,282 | B2 * | 11/2008 | Platt | 256/59 |
| 7,677,000 | B2 * | 3/2010 | Walker | 52/296 |
| 7,762,533 | B2 * | 7/2010 | DeRogatis | E04F 11/181 256/22 |
| 7,802,351 | B2 * | 9/2010 | McGinness | E04H 12/2253 256/65.14 |
| 7,850,148 | B2 * | 12/2010 | Collins, IV | 256/65.14 |
| 7,930,980 | B2 | 4/2011 | Brooke | |
| 8,083,214 | B2 * | 12/2011 | DeRogatis | E04F 11/181 256/22 |
| 8,113,473 | B2 * | 2/2012 | Bradley | E04H 12/2253 174/158 F |
| 8,113,489 | B1 * | 2/2012 | Harder | E04F 11/1834 256/22 |
| 8,342,485 | B2 * | 1/2013 | McGinness | E04H 12/2253 256/65.14 |
| 8,356,803 | B2 * | 1/2013 | Truckner | E04F 11/1834 256/67 |
| 8,382,051 | B2 * | 2/2013 | Smith | 248/221.11 |
| 8,646,735 | B2 * | 2/2014 | Bradley | E04H 12/2253 248/121 |
| 9,004,439 | B2 * | 4/2015 | Gross et al. | 248/507 |
| 2002/0040956 | A1 * | 4/2002 | Carnahan et al. | 248/188.8 |
| 2003/0233793 | A1 * | 12/2003 | Burkart et al. | 52/165 |
| 2004/0035987 | A1 * | 2/2004 | Oddsen, Jr. | A47B 49/00 248/121 |
| 2004/0222338 | A1 * | 11/2004 | Curtis | 248/158 |
| 2004/0244179 | A1 * | 12/2004 | Warfield | B21J 15/386 29/509 |
| 2005/0199161 | A1 * | 9/2005 | De Keyzer | A47B 13/023 108/115 |
| 2006/0022189 | A1 * | 2/2006 | Collins, IV | 256/65.14 |
| 2006/0059812 | A1 * | 3/2006 | Simmons | 52/296 |
| 2007/0215767 | A1 * | 9/2007 | Leary | E04H 12/2261 248/214 |
| 2008/0149791 | A1 * | 6/2008 | Bradley | 248/220.21 |
| 2008/0179579 | A1 * | 7/2008 | McGinness | E04H 12/2253 256/64 |
| 2008/0196636 | A1 | 8/2008 | Lawrence | |
| 2009/0151605 | A1 * | 6/2009 | Buhler | A47B 91/10 108/4 |
| 2009/0183354 | A1 * | 7/2009 | McGinness | E04H 12/2253 29/428 |
| 2009/0212270 | A1 * | 8/2009 | Collins, IV | 256/19 |
| 2009/0278106 | A1 * | 11/2009 | Truckner | E04F 11/1834 256/67 |
| 2012/0145854 | A1 * | 6/2012 | Smith | 248/226.11 |
| 2013/0020546 | A1 * | 1/2013 | Truckner | E04F 11/1834 256/65.02 |
| 2013/0161464 | A1 * | 6/2013 | Lin et al. | 248/278.1 |
| 2013/0328004 | A1 * | 12/2013 | Truckner | E04F 11/1834 256/65.01 |

\* cited by examiner

UNIVERSAL PEDESTAL MOUNTING ASSEMBLY

CROSS-REFERENCES TO RELATED APPLICATIONS

This application claims the benefit of U.S. Provisional Patent Application Ser. No. 61/680,603, filed Aug. 7, 2012, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The invention relates to pedestal mounting systems and, more particularly, to a universal pedestal mounting assembly that can accommodate different types and sizes of pedestals.

Over the last 60 years, boats have used different vendors to buy different types of pedestals. Some of these reasons are economic, which usually drives the customer to an aluminum pedestal. Lately, the trend has been to go towards stainless steel because of its durability and the mirror finished look. Of course stainless is much more expensive so sometimes it is not used.

Most boat, RV and related companies buy pedestals from different sources. Each company has its own way to attach its base to the floor and the pedestal to it. They also have their own fitting on the top, which presumably are designed to fit their prospective parts. Some of the top parts will fit other pedestals, but often it is unique to the manufacturer.

Due to the different designs and sizes, it is not uncommon for the installer to put the wrong deck plate on a boat. As a consequence, manufacturing time is lost, and the manufacturer will have to absorb wasted costs. Typically, each different pedestal and corresponding plate has to be approved by engineers and then put on the build drawings.

It would be desirable to provide for a universal pedestal mounting assembly utilizing a single deck plate that can accommodate any diameter pedestal tube that fits all applications for tables, bar stools and the like.

BRIEF SUMMARY OF THE INVENTION

The pedestal system according to preferred embodiments has one unique deck plate and attachment bracket that will fit from an industry standard size (2⅞ths inch) pedestal all the way up to a ten inch pedestal. The system solves many of the problems that have been around for years. Because of its design, the simplicity of making repeatable parts lends itself to economies of scale, which in turn dramatically lowers cost. This lower cost, as well as having one plate to use throughout the boat, makes assembly much simpler for large boat manufacturers, RV manufacturers, etc. The componentry and the flexibility of the design serve to streamline the engineering approval, the volume of purchasing department orders, and eliminate installation errors while providing a high-end pedestal at a much lower price. The ability to sell a larger diameter pedestal at the same or even lower cost than current standard pedestal diameters gives the end user a greater value, which ultimately helps the manufacturer's sales.

In an exemplary embodiment, a universal pedestal mounting assembly includes a deck plate securable to a supporting surface, a lower puck fixed to the deck plate, and an adapter positioned over the lower puck. A pedestal tube is positioned over the adapter. The adapter is sized corresponding to the pedestal tube. An under-mount plate assembly is positioned on the pedestal tube. The under-mount plate assembly includes an under-mount plate and an upper puck fixed to the under-mount plate. A rod is secured between the under-mount plate and the deck plate. The assembly may additionally include a cover ring disposed over the lower puck between the deck plate and the adapter. The lower puck may be fixed to the deck plate with bolts extending through the lower puck and threaded into holes in the deck plate. Preferably, the rod is a threaded rod. In this context, the lower puck may include a threaded hole, where the rod is secured through the upper puck and threaded into the threaded hole of the lower puck. A rod bolt may connect the threaded rod to the upper puck.

In one embodiment, an outermost perimeter of the adapter is sized substantially corresponding to an inside diameter of the pedestal tube. The assembly may include a plurality of adapters of varying sizes.

The under-mount plate assembly may be oriented such that the upper puck is on a side of the under-mount plate that is facing the lower puck. In this context, the upper puck may be fixed to the under-mount plate with bolts extending through the upper puck and threaded into holes in the under-mount plate.

The under-mount plate may include connector holes for securing a component to be supported on the universal pedestal mounting assembly.

In another exemplary embodiment, a universal pedestal mounting assembly includes a lower support structure securable on a supporting surface; an adapter coupled with the lower support structure; a pedestal tube positioned over the adapter, wherein the adapter is sized corresponding to the pedestal tube; an upper support structure positioned on the pedestal tube and configured to secure a component supported on the universal pedestal mounting assembly; and a rod secured between the lower support structure and the upper support structure.

In yet another exemplary embodiment, a method of mounting a pedestal to a deck using a universal pedestal mounting assembly includes the steps of securing a deck plate to the deck; fixing a lower puck to the deck plate; positioning an adapter over the lower puck; positioning a pedestal tube over the adapter, wherein the adapter is sized corresponding to the pedestal tube; fixing an upper puck to an under-mount plate, and positioning the under-mount plate and upper puck on the pedestal tube; and connecting a rod between the under-mount plate and the deck plate. Prior to the step of positioning the adapter over the lower puck, the method may include a step of selecting the adapter from a plurality of adapters of varying sizes, where the adapter is selected such that an outermost perimeter of the adapter is sized substantially corresponding to an inside diameter of the pedestal tube.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
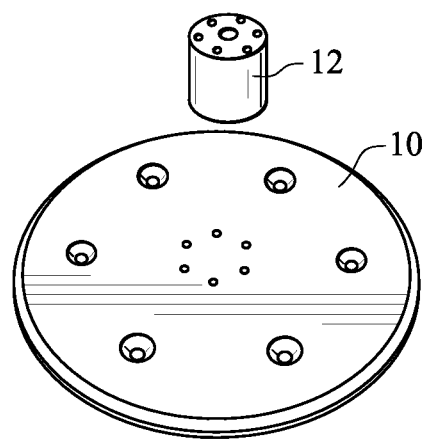
FIGS. 1 and 2 show the deck plate and lower puck of the assembly.
Figure 2:
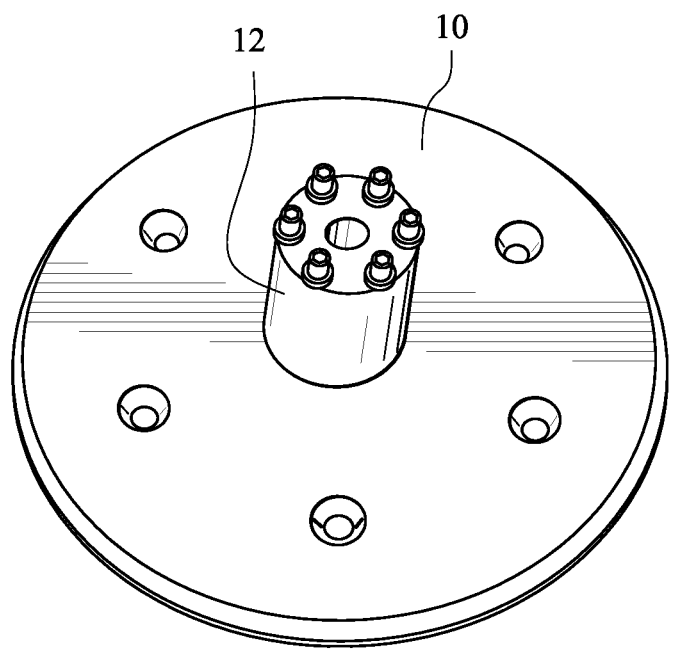

With reference to the drawings, a deck plate 10 is first mounted to a supporting surface, such as a boat deck or the like. There are several (preferably six) countersunk pass-through holes for mounting. The deck plate 10 is preferably made of 316 Stainless Steel and is ⅜" thick. A lower puck 12 is attached to the deck plate 10. The lower puck 12 may be a solid piece of Stainless Steel 2.5" tall and 2.375" in diameter with several (e.g., six shown) pass-through holes in a concentric bolt hole pattern and one threaded hole in the center. The lower puck 12 is attached to the deck plate 10 with bolts that pass-through the puck and are threaded into the deck plate 10. See FIGS. 1 and 2.

Figure 3:
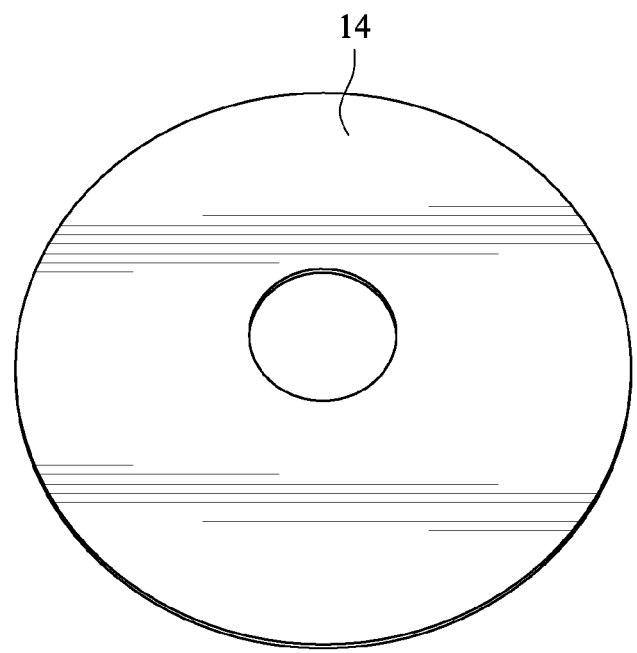
FIG. 3 shows a cover ring for placement over the deck plate.

A cover ring 14 may be placed on top of the deck plate 10 around the lower puck 12 (FIG. 3). An exemplary cover ring 14 is solid Stainless Steel and ⅛" thick. The cover ring 14 serves to disguise the deck plate mounting holes for a cleaner look.

Figure 4:
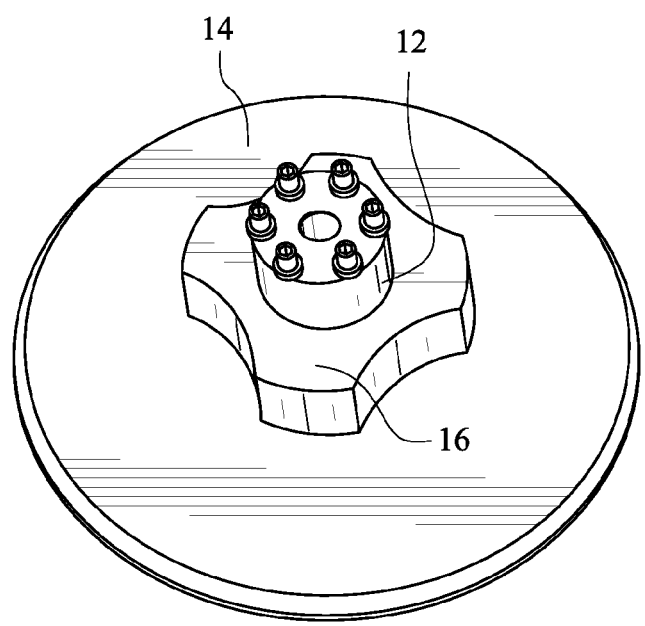
FIG. 4 shows the adapter insert in place over the lower puck.
Figure 5:
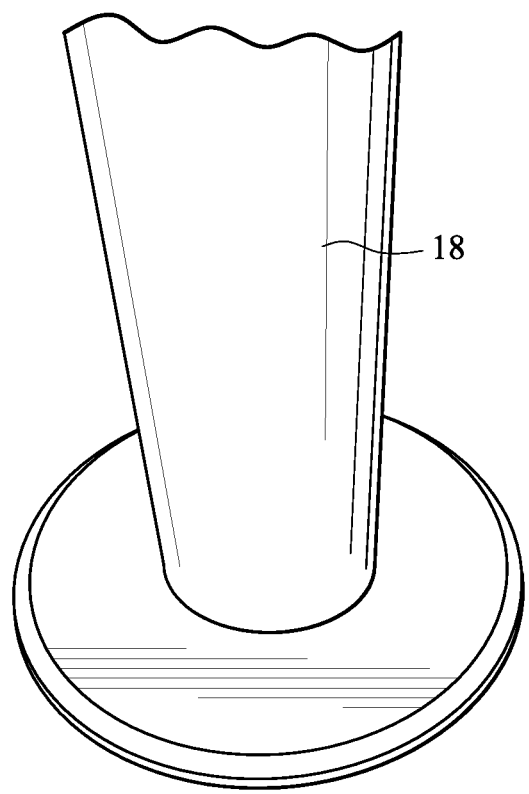
FIG. 5 shows the pedestal tube.

As shown in FIG. 4, an adapter 16 is slid down around the outside of the lower puck 12 over the deck plate 10 (and cover plate 14 if placed), and a pedestal tube 18 is placed over the adapter 16 and the deck plate 10 (FIG. 5). The adapter 16 is sized corresponding to the pedestal tube 18. Preferably, an outermost perimeter of the adapter 16 is sized substantially corresponding to an inside diameter of the pedestal tube 18. The adapter 16 serves to help center the tube 18 on the base.

The pedestal tube 18 may be formed of Stainless Steel and sits on the cover ring 14 over the adapter 16. Specifically, the tube may be solid 316 stainless steel schedule 10 tube.

Figure 6:
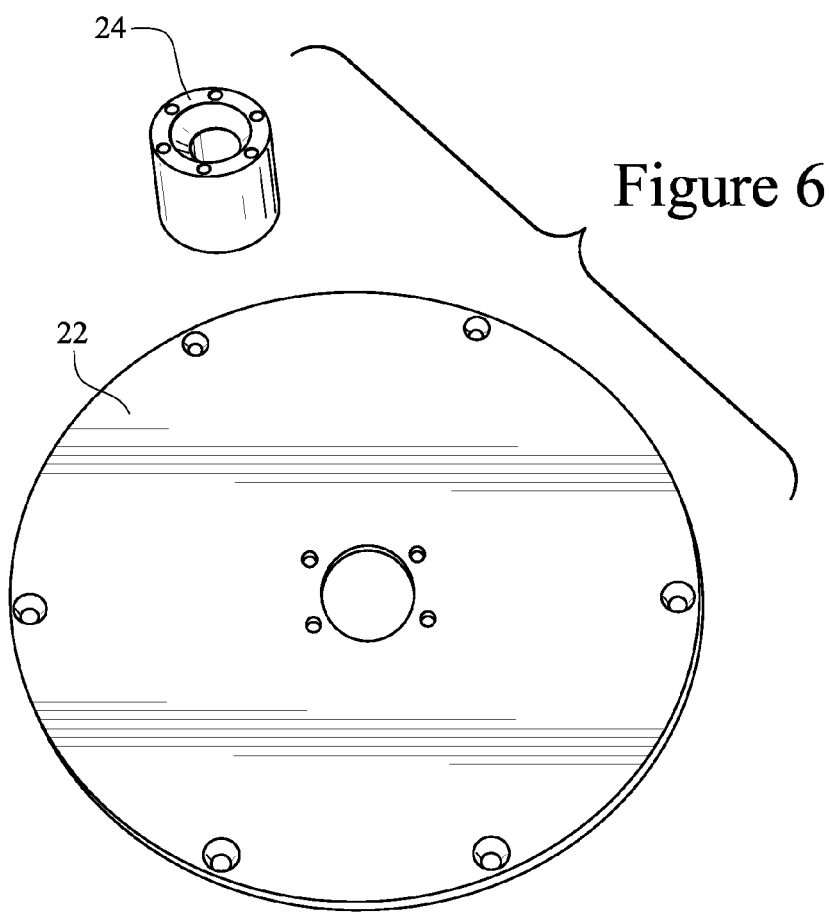
FIG. 6 shows the components of the under-mount plate assembly.
Figure 7:
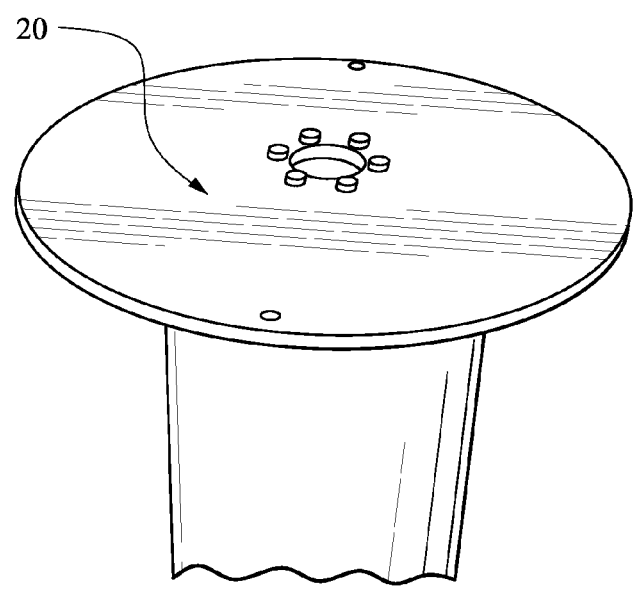
FIG. 7 shows the under-mount plate assembly installed on the pedestal.

As shown in FIGS. 6 and 7, an under-mount plate assembly 20 may be placed on top of the tube 18, centered on the tube diameter. The under-mount plate assembly 20 includes an under-mount plate 22 and an upper puck 24. The under-mount plate 22 is preferably a solid 316 Stainless Steel plate with several (e.g., six) countersunk pass-through holes for mounting a component such as a table top or the like to the pedestal system. The under-mount plate 22 also has several (e.g., six) countersunk pass-through holes in the center to secure the upper puck 24 with bolts. The upper puck 24 may be a solid piece of Stainless Steel 2.5" tall and 2.375" in diameter with several (e.g., six) ¼-20 threaded holes to connect it to the under-mount plate 22. The upper puck 24 also includes a counter-bored hole in its center. As shown, the under-mount plate assembly 20 is oriented such that the upper puck 24 is on a side of the under-mount plate 22 that is facing the lower puck 12.

Figure 8:
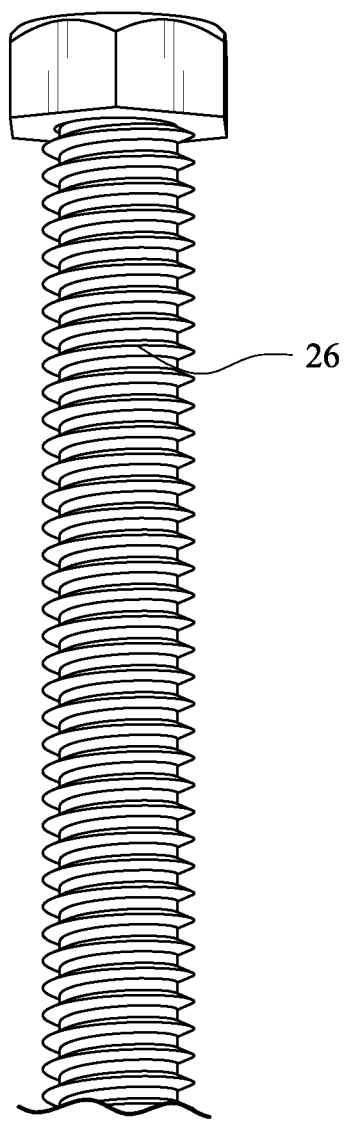
FIG. 8 shows the rod that secures the universal pedestal mounting assembly together.
Figure 9:
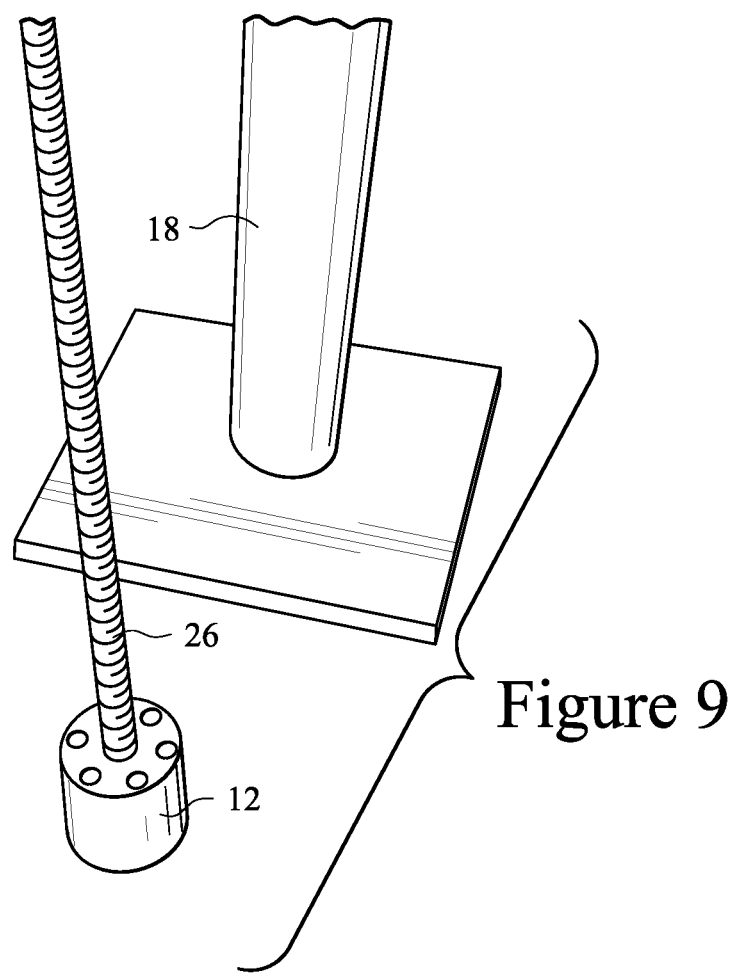
FIG. 9 shows the rod threaded into the lower puck.

An appropriate length rod 26 (FIG. 8), preferably threaded, is passed through the counter-bored hole in the center of the upper puck 24 and is threaded into the threaded hole in the center of the lower puck 12 (FIG. 9). The threaded rod 26 may be solid Stainless Steel All Thread. A suitable flat washer and lock washer can be used to lock it down. When this threaded rod 26 is tightened down completely by an external bolt, all the parts of the assembly are compressed together, creating the full pedestal system.

Figure 10:
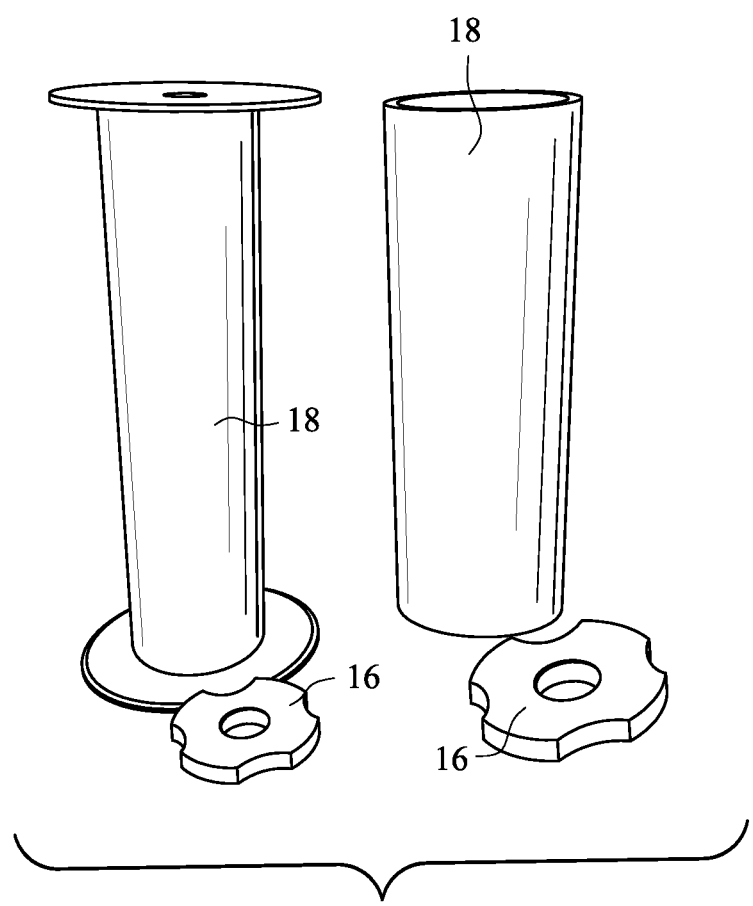
FIG. 10 shows varying pedestal sizes and varying sized adapters.

As shown in FIG. 10, using differently-sized adapters 16, various diameter tubes 18 can be mounted using the same hardware.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A universal pedestal mounting assembly comprising:
   a deck plate securable to a supporting surface;
   a lower puck fixed to the deck plate;
   an adapter positioned over the lower puck;
   a pedestal tube positioned over the adapter, wherein the adapter is sized corresponding to the pedestal tube;
   an under-mount plate assembly positioned on the pedestal tube on a side of the pedestal tube opposite from the deck plate, the under-mount plate assembly including an under-mount plate and an upper puck fixed to the under-mount plate, wherein the under-mount plate assembly is oriented such that the upper puck is on a side of the under-mount plate that is facing the lower puck; and
   a rod secured between the upper puck and the lower puck, the rod connecting the under-mount plate assembly to the deck plate, wherein the rod is a threaded rod, wherein the lower puck comprises a threaded hole, and wherein the rod is secured through the upper puck and threaded into the threaded hole of the lower puck without directly engaging the under-mount plate, the rod acting between the lower puck and the upper puck to compress the deck plate and the under-mount plate on the pedestal tube.

2. A universal pedestal mounting assembly according to claim 1, further comprising a cover ring disposed over the lower puck between the deck plate and the adapter.

3. A universal pedestal mounting assembly according to claim 1, wherein the lower puck is fixed directly to the deck plate with bolts extending through the lower puck and threaded into holes in the deck plate.

4. A universal pedestal mounting assembly according to claim 1, further comprising a rod bolt connecting the threaded rod to the upper puck.

5. A universal pedestal mounting assembly according to claim 1, wherein an outermost perimeter of the adapter is sized substantially corresponding to an inside diameter of the pedestal tube.

6. A universal pedestal mounting assembly according to claim 1, comprising a plurality of adapters of varying sizes.

7. A universal pedestal mounting assembly according to claim 1, wherein the upper puck is fixed to the under-mount plate with bolts extending through the upper puck and threaded into holes in the under-mount plate.

8. A universal pedestal mounting assembly according to claim 1, wherein the under-mount plate comprises connector holes for securing a component to be supported on the universal pedestal mounting assembly.

9. A method of mounting a pedestal to a deck using a universal pedestal mounting assembly, the method comprising:
   securing a deck plate to the deck;

fixing a lower puck directly to the deck plate;
positioning an adapter over the lower puck;
positioning a pedestal tube over the adapter, wherein the adapter is sized corresponding to the pedestal tube;
fixing an upper puck to an under-mount plate, and positioning the under-mount plate and upper puck on the pedestal tube;
connecting the under-mount plate to the deck plate by connecting a rod between the upper puck and the lower puck without directly engaging the under-mount plate; and
compressing the deck plate and the under-mount plate on the pedestal tube with the rod.

10. A method according to claim 9, wherein the connecting and compressing steps comprise extending the rod through the upper puck and the under-mount plate, threading the rod into the lower puck, and securing the rod to the upper puck with a rod bolt.

11. A method according to claim 9, wherein prior to the step of positioning the adapter over the lower puck, the method comprises selecting the adapter from a plurality of adapters of varying sizes, wherein the adapter is selected such that an outermost perimeter of the adapter is sized substantially corresponding to an inside diameter of the pedestal tube.

* * * * *